US012589483B1

(12) United States Patent
Jones et al.

(10) Patent No.: US 12,589,483 B1
(45) Date of Patent: Mar. 31, 2026

(54) MODULAR MULTI-FUNCTIONAL AND REUSABLE THREE-DIMENSIONAL WORKSURFACE FOR ROBOT AUTOMATION

(71) Applicant: RP Technologies Inc., Salt Lake City, UT (US)

(72) Inventors: Nathan Roger Jones, Los Gatos, CA (US); Daniel Cong, Santa Rosa, CA (US); Rohit Raj Puri, Salt Lake City, UT (US)

(73) Assignee: Tessella Automation Inc., Salt Lake City, UT (US)

( * ) Notice: Subject to any disclaimer, the term of this patent is extended or adjusted under 35 U.S.C. 154(b) by 316 days.

(21) Appl. No.: 17/397,960

(22) Filed: Aug. 9, 2021

(51) Int. Cl.
*B25J 9/00* (2006.01)

(52) U.S. Cl.
CPC .................................... *B25J 9/0009* (2013.01)

(58) Field of Classification Search
CPC ........ B25J 9/0009; B25J 9/0096; B25B 11/00
See application file for complete search history.

(56) References Cited

U.S. PATENT DOCUMENTS

| | | | | |
|---|---|---|---|---|
| 2013/0127194 A1* | 5/2013 | Regan | .................... | A43D 11/00 |
| | | | | 294/188 |
| 2016/0236344 A1* | 8/2016 | Edsinger | ................ | B25J 9/0096 |
| 2018/0304467 A1* | 10/2018 | Matsuura | ................ | B25J 13/06 |
| 2021/0370497 A1* | 12/2021 | Riek | ........................ | B23P 21/00 |
| 2022/0274218 A1* | 9/2022 | Ulmer | ................. | B23Q 17/007 |

FOREIGN PATENT DOCUMENTS

EP 3689539 A1 * 8/2020 .......... B25J 19/0025

OTHER PUBLICATIONS

Jeff Holt, How to Build a Tab and Slot Welding Table, Hot Bike, Published on Aug. 23, 2017, available at https://hotbike.com/how-to-build-welding-table/ (Year: 2017).*
ARCSpecialties, Wow Episode 15: Tab & Slot, YouTube, Published on May 6, 2021, available at https://www.youtube.com/watch?v=fP2PHVLj7AU (Year: 2021).*

* cited by examiner

*Primary Examiner* — Kyle A Cook
(74) *Attorney, Agent, or Firm* — PATENT LAW WORKS LLP

(57) ABSTRACT

A modular, multi-functional, and reusable three-dimensional ("3D") mounting surface for use in robotic automation to facilitate changing from one robot type to another (e.g., COTS (commercial off the shelf) robot or component) is described. A change involves removing only the surface plates without the entire mounting base plate for each product, which make the manufacture process less costly and faster to deploy. The modular design of the present invention enables a flexible mounting base plate configured to incorporate different types of robot sizes, robot cabinets, and applications. This invention is not only expandable on the three-dimensional ("3D") tessellated surface for larger robot applications, the 3D surfaces may be combined together to form even larger robot solutions for factory automation. The present invention is reconfigurable with inserts that fit precisely in the mounting base plate.

17 Claims, 13 Drawing Sheets

Figure 12:
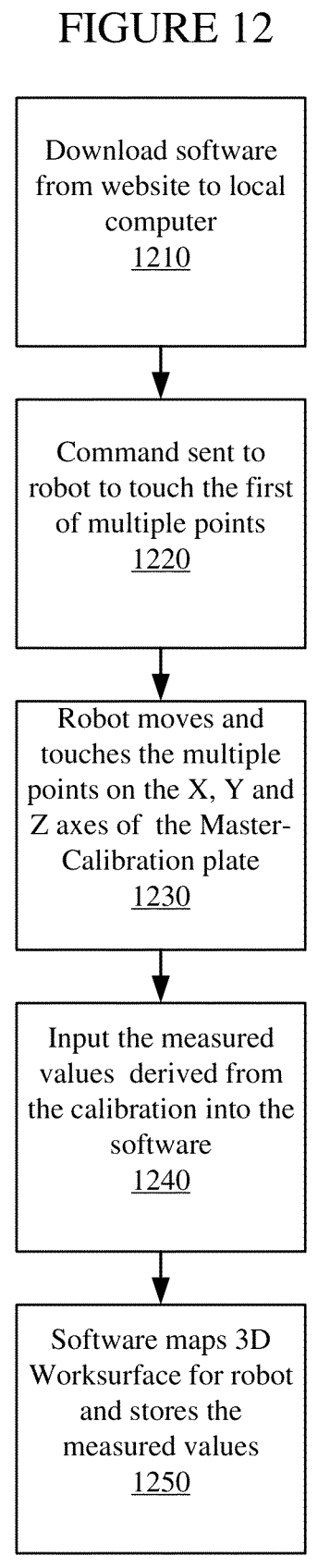

Download software
from website to local
computer
1210

Command sent to
robot to touch the first
of multiple points
1220

Robot moves and
touches the multiple
points on the X, Y and
Z axes of the Master-
Calibration plate
1230

Input the measured
values derived from
the calibration into the
software
1240

Software maps 3D
Worksurface for robot
and stores the
measured values
1250

MODULAR MULTI-FUNCTIONAL AND REUSABLE THREE-DIMENSIONAL WORKSURFACE FOR ROBOT AUTOMATION

BACKGROUND

1. Field of the Invention

The present invention relates generally to the field of manufacturing, particularly to the use of robots and automation components in manufacturing environments. More particularly, the present invention relates to a modular, multi-functional, and reusable three-dimensional ("3D") mounting surface for robotic automation.

2. Description of the Related Art

As the demand for all types of electronic products continuously increases and consumers purchase more every day, there is a continuous need to create and bring new and improved products to market faster and at less cost. To meet the growing demand, there is a dire need for rapid manufacturing of customized products and their introduction into the market. Yet, labor costs are increasing, even in lower-cost areas of the world. Automation using robots have gained traction around the globe in the last few years. As with any robotic system, the ability to handle a high mix of products from low to high volume is a daunting task, both from a time and cost perspective.

Current product manufacturing processes use a solid two-dimensional mounting base plate. There are any disadvantages to this approach. For example, current mounting base plate designs can only be customized to a single product because once they are machined, they cannot be modified or adapted for use with other products. Moreover, components and instruments cannot be mounted on the back side of the solid mounting plate as the plate is opaque and a lot of measurements cannot be made that require visual oversight from the bottom using this technology. Hence, flexibility is lost.

Existing product materials, either metal or stone, are solid structures, resulting in a higher material and processing cost. Current products using lighter weight metal structures do not have the precision required for many robotic applications. Current technologies limit the use of the instruments and components, either due to custom designs resulting in higher costs and limited ability to reuse or they are limited in functionality due to space constraints or accessibility.

Accordingly, improved systems and methods for use in robot automation are necessary to meet the ever-growing demand for rapid manufacture of electronic products at low cost.

SUMMARY

The present invention overcomes the deficiencies and limitations of prior systems and methods used in robot automation for manufacture of electronic products. The present invention advantageously addresses the problems detailed above to reduce the time that it takes to manufacture electronic products, and reduce the associated cost. These advantages are accomplished by the present invention, which quickly facilitates using the same mounting base plate for different products, changing from one product to another with ease. All that is required for different products it to reconfigure the surface plates for each new product.

In accordance with one aspect of the invention, the current invention facilitates changing from one robot type to another (e.g., COTS (commercial off the shelf) robot or component), by simply removing the surface plates and not the entire mounting base plate, with use for each product, which make the process less costly and faster to deploy. The modular design of the present invention enables a flexible mounting base plate configured to incorporate different types of robot sizes, robot cabinets, and applications. This invention is not only expandable on the three-dimensional ("3D") tessellated surface for larger robot applications, the 3D surfaces may be combined together to form even larger robot solutions for factory automation. Tab and slot design and manufacturing along with a 3D worksurface tessellation geometry of mounting base plate reduces cost by reducing the amount of material used, while keeping the tensile strength and precision integrity of the plate. The tab and slot construction eliminates the need for post-assembly finishing processes that add cost as is typical in current construction methodologies.

In accordance with yet other aspects of the invention, the present invention is reconfigurable with inserts that fit precisely in the mounting base plate to access areas of products that were not possible with existing solutions. These may be advantageously mounted on the top and the bottom side of the 3D surface enabling connections of automation components that were not possible with current solutions and practices. The mounting base plate is flexible and may be used on any new or existing robot enclosure to save costs, as the entire enclosure does not have to be replaced for new projects.

The present invention provides many benefits to users. The invention is embodied in a 3D worksurface tessellation geometry giving the user a precision surface from which to create, engineer, and design unique, unlimited robotic, automation modules, sub-modules, and assemblies. The solutions are portable, reusable, reduce engineering time, reduce engineering re-design time, reduce component waste, and increase efficiencies from prototype to production. This invention may benefit multiple organizations that are in the robot automation space including, but not limited to, robot system integrators, Original Equipment Manufacturers ("OEM") and product manufacturers.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The present invention is illustrated by way of example, and not by way of limitation in the figure of the accompanying drawing in which like reference numerals are used to refer to the same or similar elements.

FIG. 12 shows the software process flow for a 3 axis in-situ calibration.

Figure 1:
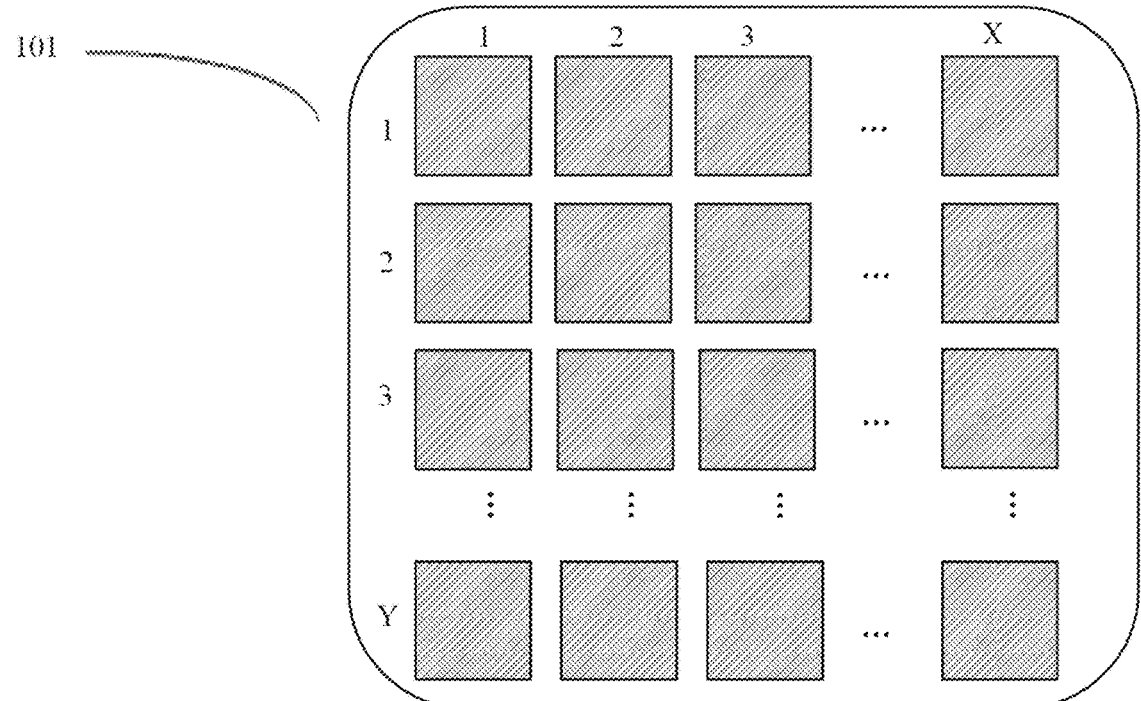
FIG. 1 is a graphical representation to illustrate a top view of the invention as a whole and to show the different possibilities for the invention.

The above-described figures depict various embodiments for purposes of illustration only. One skilled in the art will readily recognize from the following discussion that alternative embodiments of the structures and methods illustrated herein may be employed without departing from the principles described herein.

DETAILED DESCRIPTION

In the following description, for purposes of explanation, numerous specific details are set forth in order to provide a thorough understanding of this technology. It will be apparent, however, that this technology can be practiced without some of these specific details. In other instances, structures and devices are shown in block diagram form in order to avoid obscuring the innovative aspects. For example, the present technology is described by example implementations described below with reference to particular hardware and software.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

Some portions of the detailed descriptions on software workflows are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description here, any discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus or system for performing the operations described. This apparatus may be specially constructed for the required purposes, or it may be associated with a general-purpose computer selectively activated or reconfigured by a computer program stored in the computer to thereby create a special-purpose computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Parts of the present technology can take the form of an entirely hardware embodiment, an entirely software embodiment, or an implementation containing both hardware and software elements. In some implementations, the software processes or workflows of this technology are implemented in software, which includes but is not limited to, firmware, resident software, microcode, etc.

Furthermore, parts of this technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

It should be recognized that a data-processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times, code must be retrieved from bulk storage during execution.

Input/output or I/O devices (including but not limited to, keyboards, displays, pointing devices, etc.) as required may be coupled to the system either directly or through intervening I/O controllers.

Network adapters may also be coupled to the apparatus or system to enable the data-processing system to become coupled to other data-processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with programs in accordance with the teachings herein, to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

It is recognized by those skilled in the art, that precision robotics and automated workstations require precision-architecturally-controlled superstructures in the areas of orthogonality, planar straightness and flatness, and rigidity to the achieve the precise resolution and reduction of tolerance stack up, which is provided by the three-dimensional ("3D") worksurface. A 3D workspace is the space in which a robot works.

The present invention is embodied in a 3D tessellation geometry combined to form a 3D worksurface including the following base components illustrated in FIG. 1. Referring to FIG. 1, the present invention 100 illustrated generally with a 3D worksurface 100 includes a base plate 101 and surface plates 102. The base plate 101 is configured by a specialized "tab and slot" manufacturing process to create an extremely light construction, which at the same time maintains a high level of rigidity/straightness and flatness across the plane that are critical to high precision robotic and/or automation applications. The frame consists of X-Y-Z geometrically congruent cavities, in an array of X slots across, by Y slots and Z slots deep. FIG. 1 illustrates an example of a 3×3×3 tessellated array. Individual parts fabricated for the tab and slot manufacturing process have the unique advantage of gaining high precision from using relatively inexpensive cutting processes. The base plate 101 is precision machined and may be made from various types of materials, including but not limited to, aluminum, steel, carbon fiber and other composite materials. The manufacturing process, including but not limited to, is a bonding or welding process.

Figure 2:
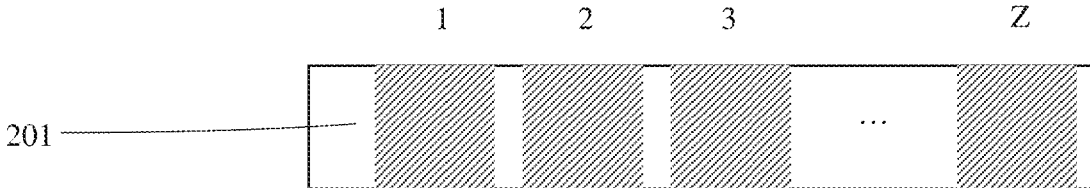
FIG. 2 illustrates a side view of the base-plate construction and the cavities traversing through the construct according to various embodiments of the invention described herein.
Figure 2:
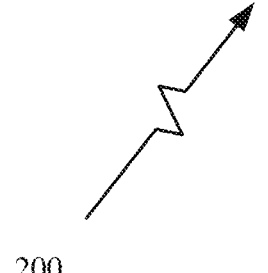

Referring now to FIG. 2, the base plate 101 utilizes an array of identical traversing cavities/inserts 201 and 301, 302 (in FIG. 3) along the X and Y axes. These cavities 302 provide a 3-dimensional work envelope creating space that is useable above the surface plates 102 or below the top surface of the base plate 101. The resulting superstructure 200 is a precisely, pre-calibrated working area for both automated and manual processes to be designed for prototyping and high-volume manufacturing.

The surface plates 102 are a tessellation of geometrically congruent plates placed in an array creating a highly flexible and repeatable structure. The surface plates form mini workspaces that can be arranged and come together to form the overall 3D worksurface to support an architected automation solution.

The surface plates 102 are precision machined and can be made from various types of materials, including but not limited to aluminum, steel, Delrin, plexiglass and plastic composite materials. The precision individual surface plates can hold a variety of different components including, but not limited to cameras, actuators, barcode readers etc.

Figure 3:
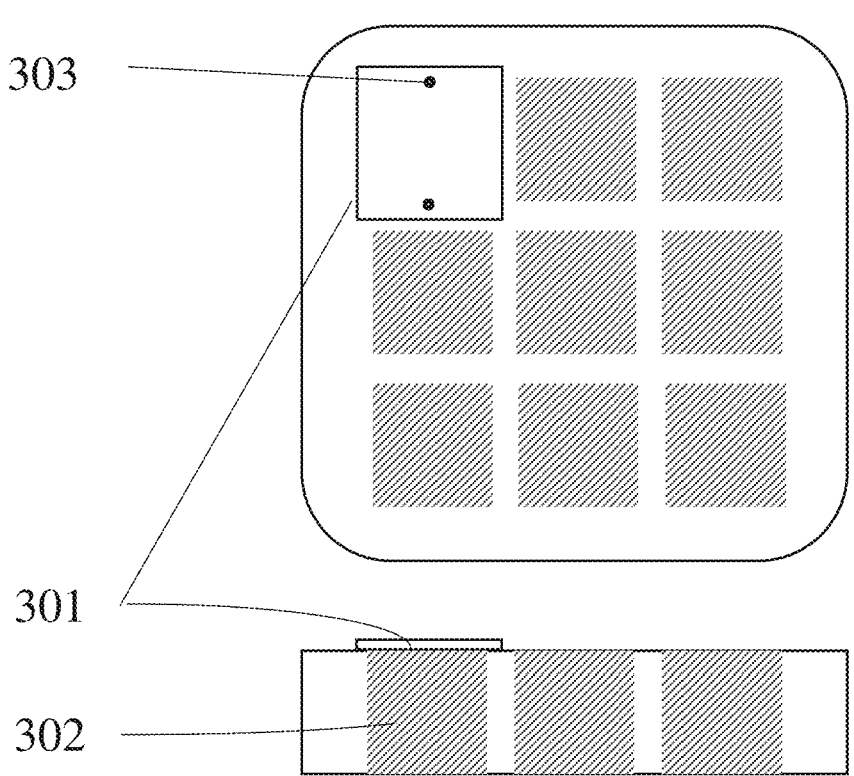
FIG. 3 illustrates example individual surface plates that are affixed to the base plate according to various embodiments of the invention described herein.
Figure 3:
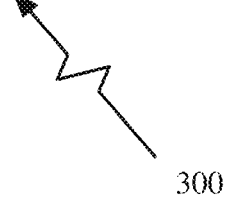

The surface plates 301 in FIG. 3 are precision machined and utilize guide pins 303 ensuring the exact positioning when affixed to the base plate. The surface plate can be arranged to cover the entire base plate 101 creating a combined 3D worksurface illustrated generally by reference numeral 300 and the plates may be arranged in any desired orientation.

Figure 4:
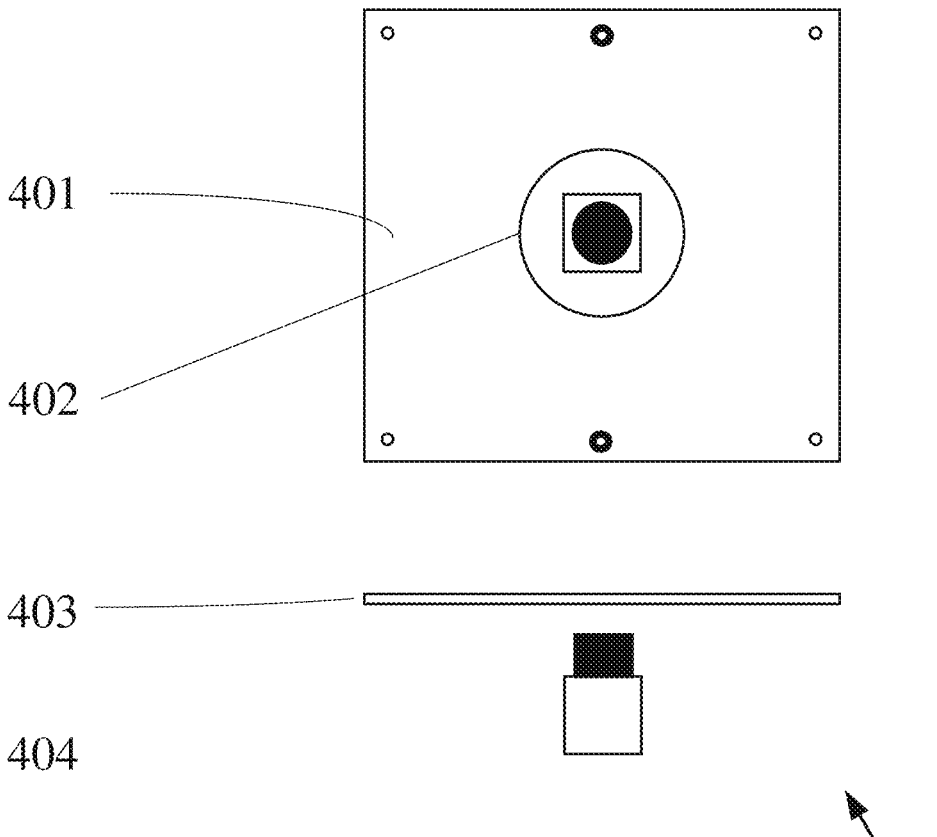
FIG. 4 illustrates a top view of the inserts engineered, usable with, but not limited for use with industry-standard, commercially-available cameras, actuators, barcode readers etc., according to various embodiments of the invention described herein.

The surface plates may be used as mini workspaces configured to design peripheral assemblies or sub-assemblies according to the "custom" requirements of a particular application. FIG. 4 illustrates an example 400 of a machined surface plate 401, 402, 403 designed to hold a commercially available vision camera 404 used typically in vision-guided robotic solutions.

Figure 5:
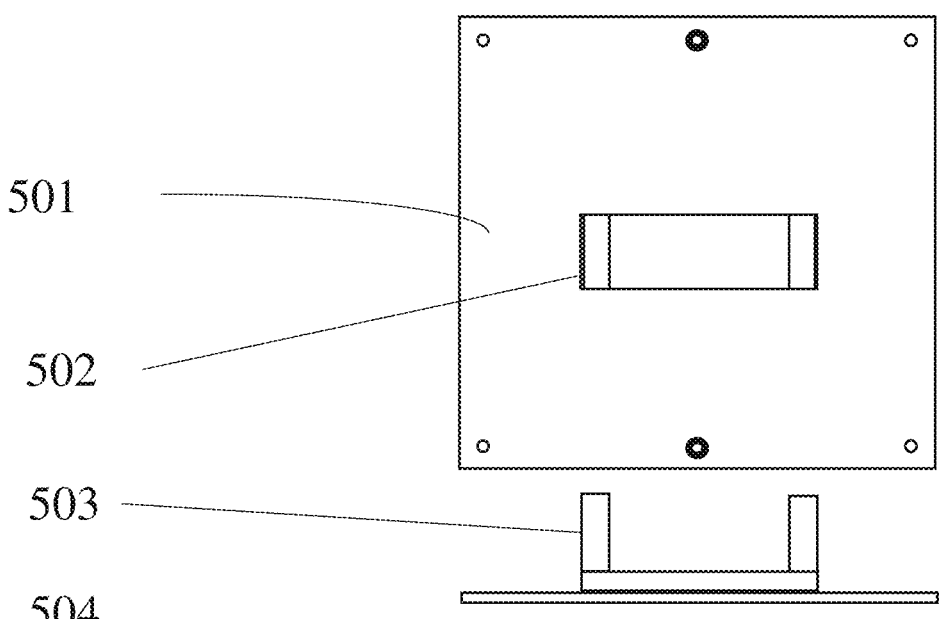
FIG. 5 shows an example of a surface plate used on the 3D worksurface.
Figure 5:
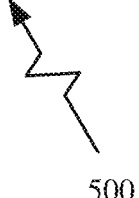
Figure 6:
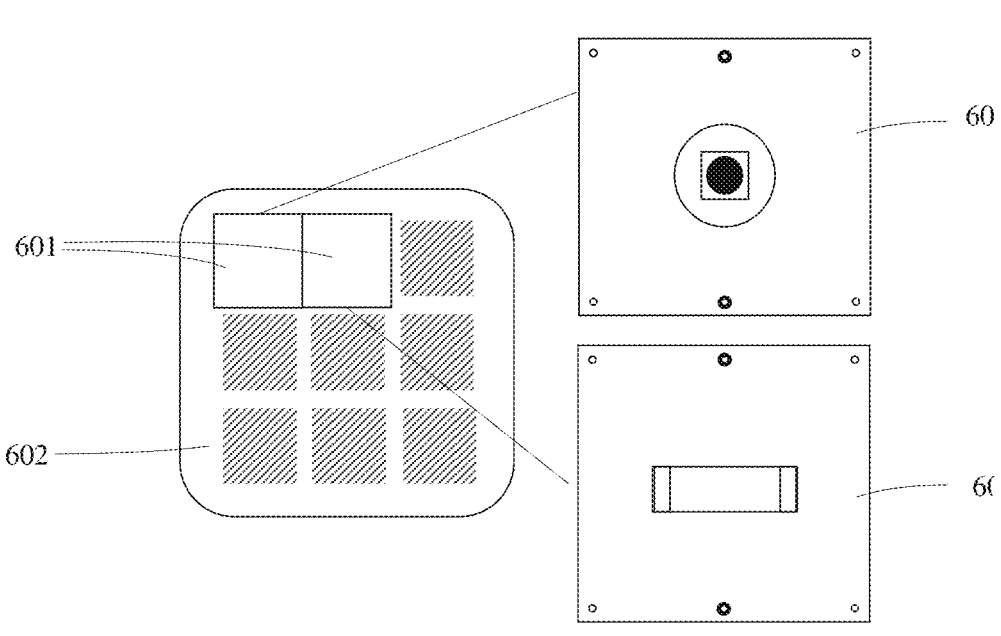
FIG. 6 shows an example of an array of surface plates and inserts populated or unpopulated to make up the automation 3D worksurface according to various embodiments of the invention described herein.
Figure 6:
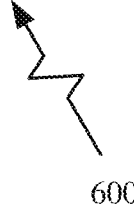
Figure 7:
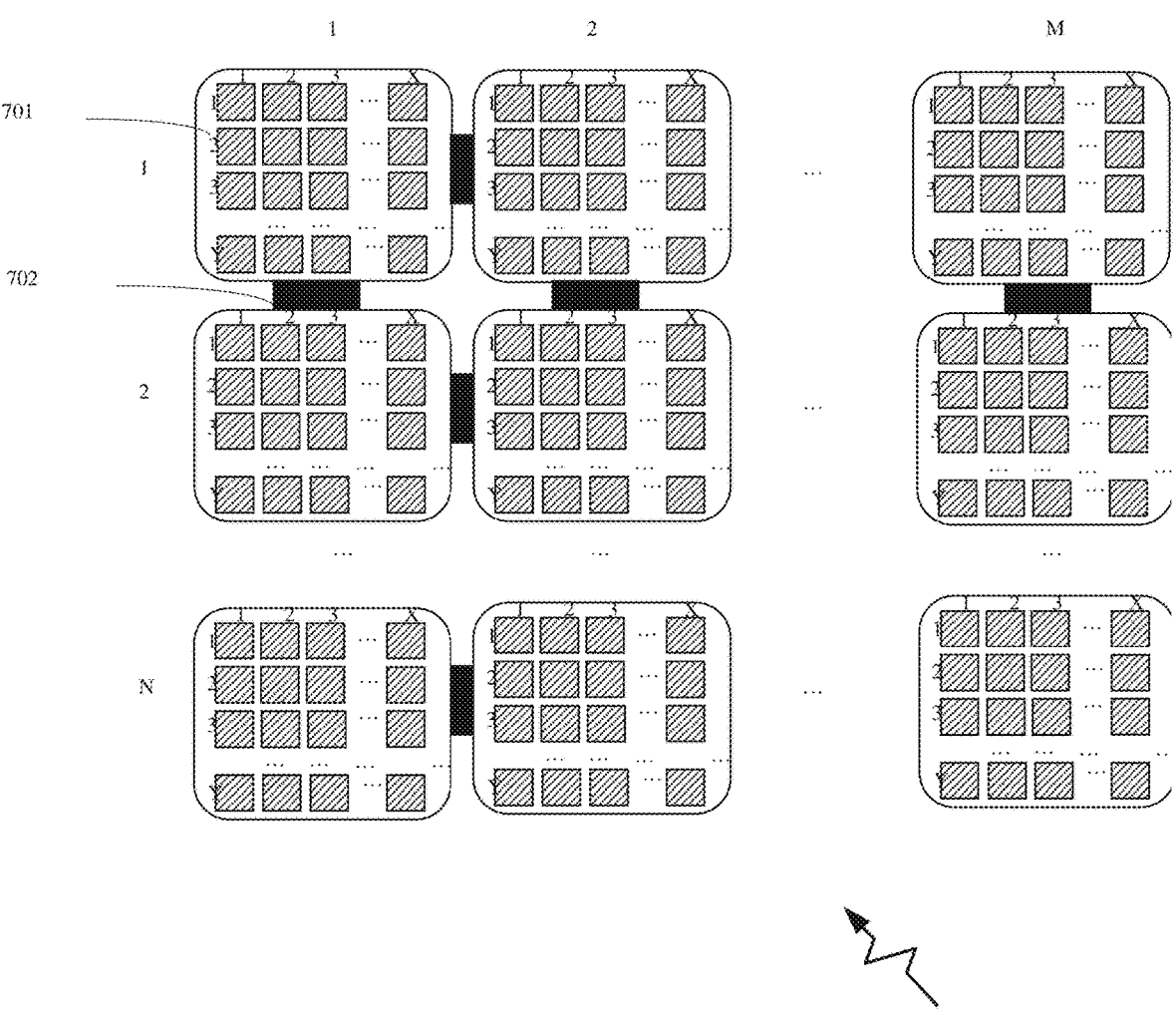
FIG. 7 shows the modular expansion capability of the 3D worksurface to encompass a larger robot worksurface by connecting the 3D worksurfaces together in different combinations.
Figure 8:
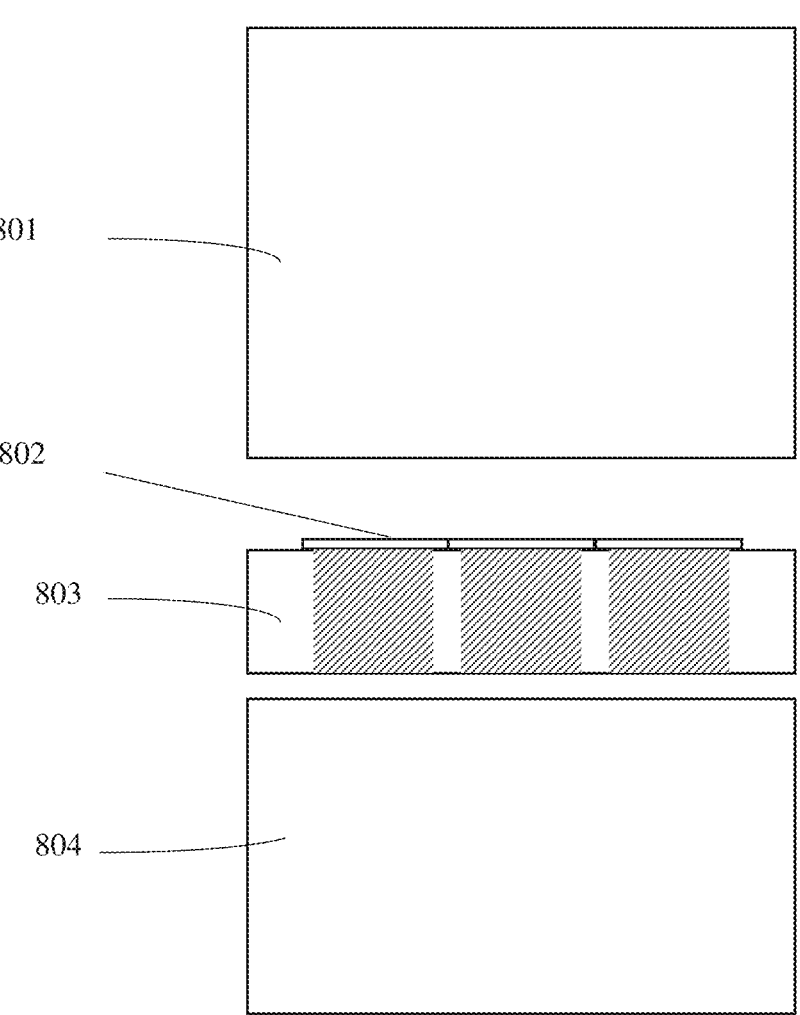
FIG. 8 shows how the 3D worksurface is inserted inside a workstation within the top and bottom enclosure of an example robot automation system.
Figure 8:

FIG. 5 shows another example 500 of a surface plate 501, 504, engineered to hold a custom part 502, 503. FIG. 6 illustrates an example 600 with the base plate 602 (referenced as 101 in FIG. 1) configured to accept multiple surface plates 603, 604 in a desired positional array 601, either wholly or semi-populated within the base plate inserts to support the desired application requirement. The surface plates 602 may be utilized, but not limited to, mount any type of robot, gantry systems or any other robotic or automated assembly or sub-assembly. Referring now to FIG. 7, in an example 700, reference numeral 701 points to the expansion capability of the 3D worksurface by combining the units using precision brackets 702. The 3D worksurfaces may be combined to form larger robot work areas without having to build one solid surface that will be too heavy to manufacture and deploy on the manufacturing floor. The final completed work surface system may be inserted in a variety of manual or automated workstations. FIG. 8 illustrates an embodiment 800 with the 3D worksurface 802, 803 inserted into a manual or automated workstation with a top enclosure 801 and a bottom enclosure 804. The base plate and surface plates may be re-used or reconfigured or stored for future projects.

Every robot that is used in automated manufacturing with the 3D worksurface may be calibrated to the working envelop of the 3D worksurface. This calibration may be executed at startup. Also, it may be periodically checked to follow Preventative Maintenance ("PM") guidelines to ensure that the robot is functioning properly and still within calibrated metrics or limits of the 3D worksurface. The calibration techniques used consist of three parts. One (example 900) is a precision-milled-3D-worksurface master calibration plate 904 illustrated in FIG. 9 and in FIG. 10, designated by reference numeral 1040. The other is a dial 901 in FIG. 9, also designated as 1010 in FIG. 10 and on the robot arm 902 in FIG. 9, designated 1020 in FIG. 10. The third is a software routine as shown in FIG. 11 (example embodiment 1100) and FIG. 12.

Figure 9:
FIG. 9 shows a master calibration plate and a robot dial for a 2 axis in-situ calibration.
Figure 9:
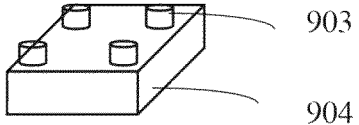
Figure 9:

The master calibration plate 904 in FIG. 9 consists of multiple finely-positioned points along the X and Y axes as shown in FIG. 9, by reference numeral 903. Each point has a pre-defined measurement. The master calibration plate is placed on the 3D worksurface base plate in a predetermined and known position. The robot is placed in the predetermined and known location on the 3D-Worksurface-base plate and the dial is attached to the robot arm.

Figure 11:
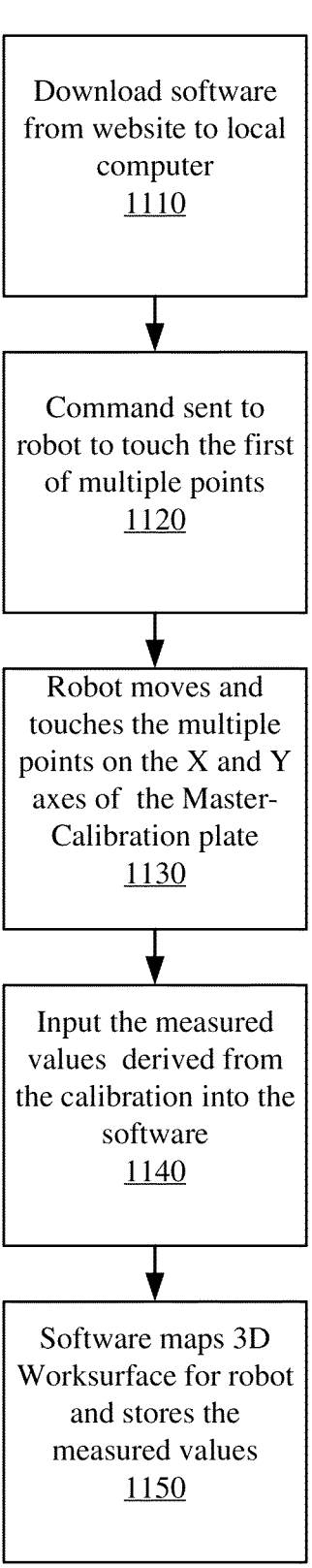
FIG. 11 shows the software process flow for a 2 axis in-situ calibration.

Referring now to FIG. 11, the software flowchart as illustrated in FIG. 11 is downloaded from the website 1110 to the connected computer that accesses the website (or other remote location hosting the software) and the software then initiates the process for the robot to receive a command to execute actions to touch the multiple points on the master calibration plate 1120. The process proceeds to the next step 1130, including one or more operations for the robot to move on an X and Y axis plane of the master calibration plate. The process proceeds to the next 1140, including one or more operations to record the values into the software. The process proceeds to the next step 1140, including one or more operations for the software to then take the recorded values. The process proceeds to the next step 1150, including one or more operations, to map the entire 3D worksurface base plate to provide the working envelop for the robot. During the PM (Preventive Maintenance), the software may be initiated to check these values again against the previously recorded value (as in step 1140).

Figure 10:
FIG. 10 shows the master calibration plate and the robot dial for a 3 axis in-situ calibration.
Figure 10:
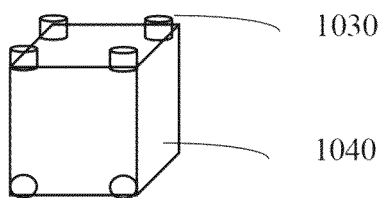
Figure 10:

The master calibration plate 1040 illustrated in FIG. 10 consists of multiple points 1030 in FIG. 10 along the X, Y, and Z axes. Each point has a pre-defined measurement. The master calibration plate 1040 is placed on the 3D worksurface base plate in a predetermined and known position. The robot is placed in the predetermined and known location on the 3D worksurface base plate and the dial is attached to the robot arm. The software flowchart as shown in FIG. 11 is downloaded from the website to the connected computer accessing the website and the software then initiates the robot to touch the multiple points on the 3D master calibration plate and record the values. The software then takes the recorded values and maps the entire 3D Worksurface base plate (X, Y and Z area) to provide the working envelop for the robot. During the PM (Preventive Maintenance), the software may be initiated to check these values again against the master-calibrated plate.

The software flowchart illustrated in FIG. 12 is downloaded from the website 1210 to the connected computer that accesses the website (or other remote location hosting the software) and the software then initiates a step 1220 for the robot to execute actions to touch the multiple points on the master calibration plate. In accordance with the next step 1240, the robot moves on an X and Y and Z axis plane of the master calibration plate and records the values into the software. At the next step 1250 of the process, including one or more operations, the software then takes the recorded values and maps the entire 3D worksurface base plate to provide the working envelop for the robot. At the next step 1240, during the PM (Preventive Maintenance), the software may be initiated to check these values again against the previously recorded value.

Figure 13:
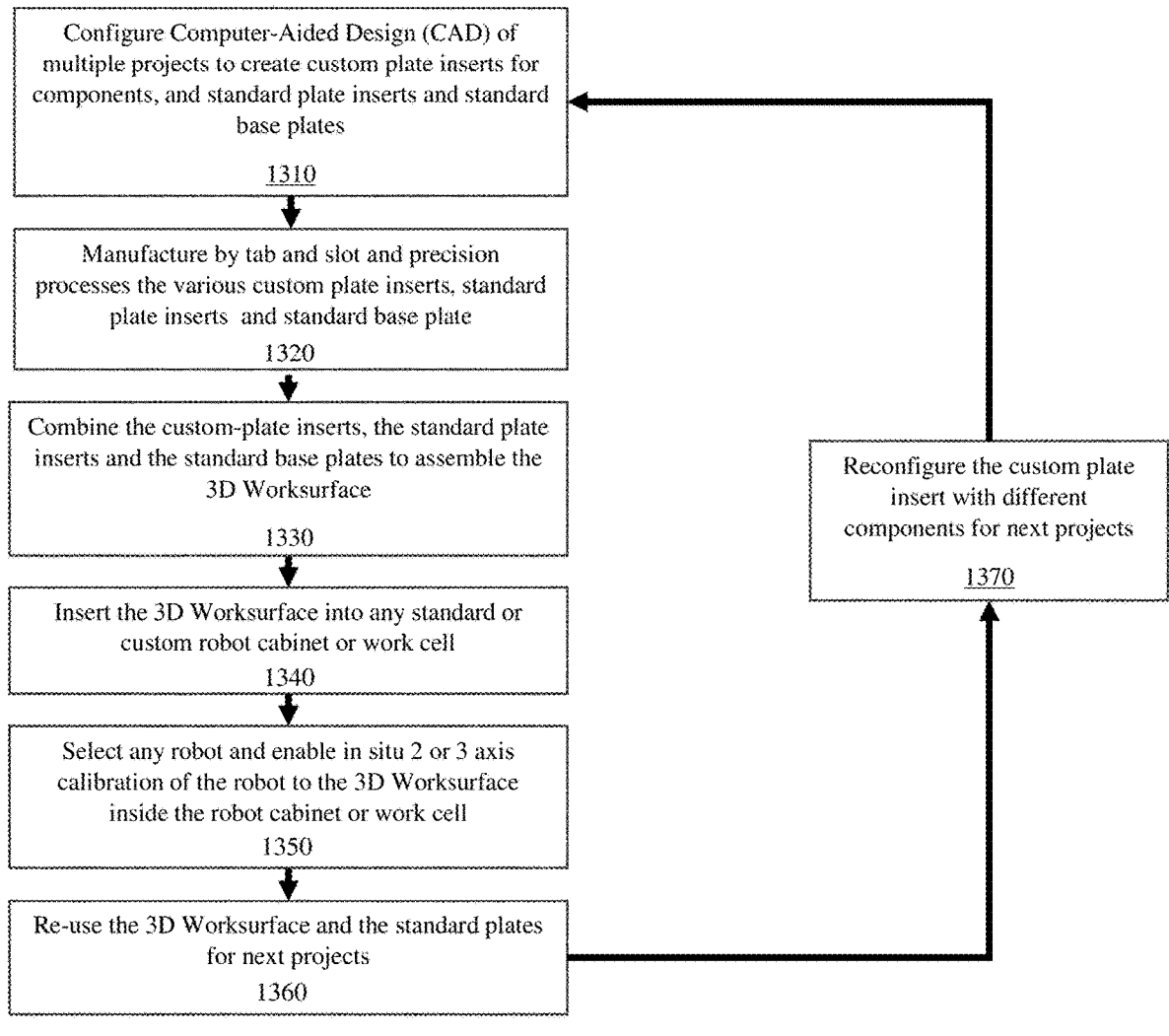
FIG. 13 shows the overall process flow to create a 3D Worksurface.

FIG. 13 illustrates an example of the entire work flow of the 3D worksurface. The work flow begins with a step 1310 to configure computer-aided design ("CAD") of multiple projects to create custom-plate inserts for components, and standard-plate inserts and standard base plates. The next step 1320 illustrates manufacture by tab and slot and precision processes of the various custom surface plates, standard surface plates and standard base plates. The next step 1330 combines the custom surface plates, the standard surface plates, and the standard base plates to assemble the 3D worksurface. The workflow proceeds to the next step 1340, including one or more operations, to insert the 3D worksurface into any standard or custom robot cabinet or workstation. The workflow proceeds to the next step 1350, including one or more operations to, select any robot and enable in situ 2 or 3 axis calibration of the robot to the 3D worksurface inside the robot cabinet or workstation. The workflow proceeds to the next step 1360, including one or more operations to, re-use the 3D worksurface standard surface plates for the next projects. The workflow proceeds to the next step 1370, including one or more operations to, reconfigure the custom surface plates with different components for next projects. The workflow proceeds to the next step 1380, to determine if the 3D Worksurface is no longer used, at which point, the process ends.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment.

What is claimed is:

1. A multi-body platform comprising:
a base plate and a plurality of surface plates removably secured on the base plate using guide pins for positioning on the base plate, the plurality of surface plates forming a tessellated worksurface for a robot, a component or an instrument for use in an automation process, wherein the base plate comprising an array of cavities, each cavity configured to permit passage and installation of mechanical and electrical components and instruments therein, the plurality of surface plates and the mechanical and electrical components and instruments being reconfigurable and reusable on the base plate, each surface plate arranged to cover only one respective cavity of the array of cavities, and the surface plates collectively form the tessellated worksurface over the base plate and above the array of cavities.

2. The multi-body platform according to claim 1, wherein the base plate is configured to accept the plurality of surface plates arranged in a desired positional array, wherein the plurality of surface plates are configured to mount different robot types.

3. The multi-body platform according to claim 1, wherein a workspace is expandable by combining a plurality of multi-body platforms using brackets, wherein the combination creates an expanded workspace for robotic automation.

4. The multi-body platform according to claim 1, wherein the multi-body platform operable within a 2-axis or 3-axis in-situ calibration program using a master calibration plate, the master calibration plate comprising a plurality of positioning points arranged along X and Y axes, each point having a pre-defined measurement, wherein the multi-body platform is configured for robot calibration and preventative maintenance checks using the calibration program, the 2-axis or 3-axis in-situ calibration program is a software program that records calibration values generated during robot movement on the X and Y axis plane of the master calibration plate and compares the recorded calibration values against previously recorded reference values to verify accuracy.

5. The multi-body platform according to claim 4, wherein the software program is downloadable from a website or a remote location hosting the software program, wherein the software program controls the robot to touch the plurality of positioning points on the master calibration plate and record the corresponding calibration values.

6. The multi-body platform of claim 5 wherein the previously recorded reference values are maintained in a memory accessible to the software program.

7. A method comprising:
creating a multi-body platform, including:
connecting a plurality of surface plates on a base plate to create a tessellated worksurface for use by at least one of a robot, a component or an instrument for use in an automation process, wherein the base plate further comprises an array of cavities, each cavity configured to permit passage and installation of a plurality of different mechanical and electrical components and instruments therein, wherein the plurality of surface plates and the plurality of different mechanical and electrical components and instruments are each reconfigurable and reusable on the base plate to adapt the base plate and the array of cavities to different automation requirements, the connecting step further including:
affixing the plurality of surface plates to the base plate using guide pins, wherein each surface plate is arranged to cover only one respective cavity of the array of cavities and the surface plates collectively form the tessellated worksurface over the base plate and above the array of cavities; and
mounting at least one robot to the multi-body platform by positioning the robot and its components onto the tessellated worksurface created by the surface plates.

8. The method of claim 7, further comprising:
using a tab and slot manufacturing process to create the base plate.

9. The method of claim 7, wherein the plurality of surface plates forms a plurality of modular, mini workspaces.

10. The method of claim 7, further comprising:
removing the plurality of surface plates from the base plate to reconfigure the multi-body platform for production of different products, wherein removal of the surface plates enables reinstallation of a different set of surface plates or components on the same base plate to adapt the worksurface for a new assembly or production process.

11. The method of claim 7, further comprising:
performing a 2-axis or 3-axis calibration program in-situ on the multi-body platform, wherein the 2-axis or 3-axis calibration program is a software program that utilizes a master calibration plate on the multi-body platform, wherein the master calibration plate comprises a plurality of positioning points disposed along X and Y axes, each positioning point having a pre-defined measurement for reference during calibration and maintenance checks.

12. The method of claim 11, wherein the step of performing the 2-axis or 3-axis in situ calibration program in-situ further comprises: movement of the robot on the X and Y axis plane of the master calibration plate on the multi-body platform, wherein the software program records values and compares the values against previously recorded values to verify calibration accuracy.

13. The method of claim 11, wherein performing the 2-axis or 3-axis calibration program further comprising:
accessing the software program running on a processor, the software program executing actions to touch the plurality of positioning points on the master calibration plate, record a plurality of calibration values and map the base plate to define a working envelope for the robot.

14. The method according to claim 13, wherein the software program is downloaded from a website or a remote location hosting the software program.

15. The method according to claim 13, wherein the software program is configured to check the plurality of values that are recorded with previously recorded values stored in a memory accessible to the software program.

16. The method according to claim 13, wherein the plurality of surface plates are configured to mount different robot types.

17. The method according to claim 13, wherein a workspace is expandable by combining a plurality of the multi-body platforms with a bracket to create a larger robot work area.

* * * * *